United States Patent [19]

Darling

[11] 4,443,487

[45] Apr. 17, 1984

[54] PROCESS FOR PRODUCING A SPREADABLE EMULSION

[75] Inventor: Donald F. Darling, Denton, England

[73] Assignee: Lever Brothers Company, New York, N.Y.

[21] Appl. No.: 351,729

[22] Filed: Feb. 24, 1982

[30] Foreign Application Priority Data

Feb. 27, 1981 [GB] United Kingdom ............... 8106209

[51] Int. Cl.³ .............................................. A23D 3/02
[52] U.S. Cl. ...................................... 426/603; 426/604
[58] Field of Search ........................ 426/602, 603, 604

[56] References Cited

U.S. PATENT DOCUMENTS

| | | | |
|---|---|---|---|
| 2,919,196 | 12/1959 | Duin et al. | 426/604 |
| 2,921,855 | 1/1960 | Melnick et al. | 426/603 |
| 2,973,269 | 2/1961 | Melnick | 426/603 |
| 3,939,282 | 2/1976 | Carlile et al. | 426/603 |
| 4,146,652 | 3/1979 | Kahn et al. | 426/602 X |
| 4,273,795 | 6/1981 | Bosco et al. | 426/602 |
| 4,362,758 | 12/1982 | MacNeill et al. | 426/604 X |

Primary Examiner—Robert A. Yoncoskie
Attorney, Agent, or Firm—Amirali Y. Haidri; James J. Farrell

[57] ABSTRACT

A process for producing a spreadable emulsion starting from an oil-in-water (o/w) emulsion which on cooling is caused to destabilize and at least partially invert, almost spontaneously or under a mild shearing regime, preferably applying a temperature cycling, to obtain a spread having a consistency comparable to that of a soft margarine. The o/w emulsion comprises (i) an emulsifier system which promotes surface nucleation of fat crystals on cooling and growth of fat crystals through the oil/water interface and into the aqueous phase and (ii) a fat having at 10° C. a solid fat level higher than 40%.

15 Claims, No Drawings

PROCESS FOR PRODUCING A SPREADABLE EMULSION

The present invention relates to a process for producing a spreadable emulsion starting from an oil-in-water emulsion which is caused to destabilize under relatively mild conditions to obtain a spread, preferably a low-calorie spread i.e. a spread containing 30 to 60% fat, having a consistency comparable to that of a soft margarine.

It is known to achieve phase inversion by subjecting emulsions to cooling and working, for instance by churning or in a Votator apparatus, as described in Margarine by A. J. C. Andersen, Second Revised Edition 1965, Pergamon Press.

The amount of working to be applied in order to achieve phase inversion is fairly high, special equipment is required and the process is time-consuming.

There is a need for a simple process for converting an oil-in-water emulsion (o/w) or cream into a spreadable emulsion.

Applicants have found a process by which a cream containing a judicious selection of ingredients is caused to invert almost spontaneously.

The invention is based on the discovery that the stability of non-dairy cream emulsions is related to the crystallization behaviour of the constituting fat phase which is itself affected by the emulsifier type and concentration.

Applicants have found that the use of specific emulsifier systems in a particular concentration can lead to one or more of the following:

(a) surface nucleation of fat crystals on cooling, (b) deformation of fat droplets such that they are no longer spherical and (c) growth of triglyceride crystals through the oil/water interface and into the aqueous phase.

Deformation of droplets and needle growth result in emulsions which are very sensitive to shear. In particular emulsions containing the fat crystal needles can be extremely unstable such that pouring, merely cooling or the natural Brownian motion are sufficient to destabilize the emulsion.

A consequence of surface nucleation is the development of a crystalline shell around the periphery of a dispersed droplet. Such a structure on cooling will be unstable due to the development of a (positive) internal pressure. Optical microscopy has revealed deformed fat droplets in emulsions where surface nucleation has occurred. Surface nucleation leads to a crystalline shell which ruptures on cooling. The more robust portion of the shell continues to grow whilst physically preventing the growth of the other crystals. The rupturing process is also governed by the particle size of the droplets, small droplets being sufficiently robust to withstand pressure changes and large droplets not forming a complete shell.

It is believed that for surface nucleation to take place, the hydrophobic part of the emulsifier (in most cases the hydrocarbon chain of the fatty acid residue) should be chemically related to the fatty acid chains of the triglyceride molecules in the fat. Moreover the packing arrangement of the emulsifier molecules at the oil/water interfaces should preferably be similar to that in a triglyceride crystal.

It is believed that at relatively low concentrations the emulsifier molecules are not sufficiently closely packed to act as a surface nucleator and hence deformation is less likely to occur. Deformed fat droplets are more prone to coalescence than spherical droplets particularly in a shear field.

Needle growth occurs from a tangential position on a fat droplet and preferentially from relatively small droplets.

Applicant's current view is that surface nucleation leads to the development of a crystal which in the absence of an interfacial energy barrier would grow longitudinally out into the aqueous phase. Because the crystals are forced to grow around the circumference of the droplet, they have a dislocated structure. The smaller the droplet, the greater the number of defects in the crystal. Therefore, if the interfacial energy barrier is low, crystals could theoretically grow into the aqueous phase, particularly from small droplets where the radius of curvature is small and hence the stresses at the surface of the crystals are high.

When specific emulsifiers are present in a sufficiently high concentration, contact angle measurements between liquid oil, crystalline fat and the aqueous phase have indicated that the liquid oil does not wet the fat crystal. The interfacial energy barrier is under these conditions sufficiently low for needle growth to occur.

According to the present invention oil-in-water emulsions are provided which comprise:

(a) 20–80% of a dispersed fat having at 10° C. a solid fat content higher than 40%, the major dimension of which does not exceed 6 microns;

(b) 80–20% of an aqueous phase;

(c) an effective amount of an emulsifier conducive to surface nucleation of fat crystals, deformation of the dispersed fat and/or growth of triglyceride crystals through the oil/water interface into the aqueous phase.

Useful fat components are those having a relatively high melting point, preferably ranging from about 30° C. to 70° C. These fats are traditionally hydrogenated fats, preferably hydrogenated vegetable fats which at chill temperatures (0° to about 10° C.) have a solid fat content higher than 40%, preferably higher than 60%. Particularly useful fat blends may comprise hardened palm kernel fat (melting point 38° C.), tristearin (melting point 72° C.), tripalmitin (melting point 65° C.), hardened vegetable oils such as bean oil (melting point 38° C.), hardened coconut oil (melting point 33° C.), hardened palm oil (melting point 43° C.), and high melting stearin fractions from vegetable or animal fats preferably less than 50%, of non-hardened, liquid vegetable oil such as soybean oil, sunflower oil, cottonseed oil and the like.

The major dimension of the dispersed fat will preferably be less than 3 microns since the crystals formed will more readily grow through the oil/water interface which ultimately results in destabilization of the emulsion.

The aqueous phase may contain minor components such as salts, flavouring agents and thickening agents.

Applicants have found that it was advantageous to use specific thickening agents which promote coalescence of the dispersed fat. Those thickening agents comprise carrageenan and/or alginates in a concentration ranging from 0.05 to 0.5 wt.%.

Useful and preferred emulsifiers are those having an HLB value greater than 9 and particularly those selected from the group consisting of polyoxyethylene sorbitan monostearate, -palmitate, -laurate, polyglycerol esters of fatty acids, sucrose fatty acid esters, lecithin. It is also possible to use these emulsifiers in combination with low HLB emulsifiers such as sorbitan-monostearate, -monopalmitate, -monolaurate, monoglycerides. Under specific conditions it is useful to use a monoglyceride to induce the effect in addition to a higher HLB-emulsifier.

The emulsifier system may also comprise a protein and an emulsifier of an HLB value lower than 9.

The concentration required can be found in each particular case depending on the nature of the emulsifier and the components of the emulsion. It is useful to use the total emulsifier in an amount sufficiently high to achieve at least a monolayer coverage and preferably at a level sufficient to achieve 2-3 layers coverage at the oil/water interface.

In the case where Tween 60 (polyoxyethylene sorbitan monostearate), Tween 40 (polyoxyethylene sorbitan monopalmitate) or Tween 20 (polyoxyethylene sorbitan monolaurate) were used, a concentration of at least 0.1% and preferably from 0.2%-1% was adequate for producing emulsions which destabilize and at least partly invert almost spontaneously.

The process according to the invention for producing spreadable emulsions, comprises:

(a) producing an oil-in/water emulsion which comprises
  (i) 20-80 wt.% of a dispersed fat having at 10° C. a solid fat content exceeding 40%, of which the average major dimension does not exceed 6 microns;
  (ii) 80-20 wt.% of an aqueous phase, and
  (iii) an effective amount of an emulsifier conducive to surface nucleation of fat crystals, deformation of the dispersed fat and/or growth of fat crystals through the oil/water interface into the aqueous phase;

(b) cooling said emulsion to allow fat crystallization to take place and at least partly achieve phase inversion and;

(c) applying a temperature cycling involving warming up the cooled emulsion to a temperature at which partial melting occurs, followed by cooling to a temperature at which the fat at least partly recrystallizes.

The preferred process according to the invention involves cooling the o/w emulsion described above to a temperature ranging from 0° to 15° C., heating up the emulsion to melt at least part of the fat and subsequently cooling the emulsion to a temperature not exceeding 15° C.

Preferably the emulsion is cooled to a temperature ranging from 5° to 10° C., then heated up to a temperature preferably ranging from 20° to 45° C. and ideally from 25° to 35° C. and then cooled again to below 15° C. This temperature cycling may be applied more than once.

Step (b) is preferably applied in combination with a mild shearing regime which may consist in gently agitating the emulsion e.g. by mixing or pouring it. Shear can be applied while cooling the emulsion or after having cooled the emulsion.

Temperature cycling and shear promote recrystallization of the fat whilst shear promotes destabilization of the emulsion and both improve the firmness of the spread.

The invention will now be illustrated in the following examples:

EXAMPLE 1

An o/w emulsion was prepared starting from the following composition:

|  | % |
|---|---|
| Hardened palm kernel oil (m.p. 38° C.) | 40 |
| Polyoxyethylene sorbitan monostearate | 1 |
| Sodium chloride | 0.2 |
| Water up to 100% | |

The emulsion was subjected to high pressure homogenization at 2000 psi to achieve a dispersion of the fat in droplets of less than 3 microns.

The emulsion was cooled to 10° C. and allowed to stand overnight. The emulsion was poured into a container, warmed up to 25° C. and then cooled to 10° C. A spread with a smooth consistency was obtained.

EXAMPLE 2

An o/w emulsion having the following composition was produced:

|  | % |
|---|---|
| Hardened palm kernel fat (m.p. 38° C.) | 14 |
| Hardened coconut fat (m.p. 33° C.) | 10 |
| Coconut oil | 10 |
| Hardened palm oil (m.p. 43° C.) | 6 |
| Saturated monoglyceride | 0.3 |
| Lecithin | 0.3 |
| Carrageenan | 0.1 |
| Egg-yolk | 3.45 |
| Egg-white | 4.00 |
| Sucrose | 2.30 |
| Water up to 100% | |

The emulsion was produced as follows:

(1) water was warmed to 50° C. and the egg-components were added;

(2) the fat and the fat soluble components were added and mixed at 55° C.;

(3) the o/w emulsion was produced under high pressure homogenization at 2000 psi.

The emulsion was cooled at 5° C. in a refrigerator, warmed up to 25° C. and then cooled again to 5° C. to obtain a spread having a good consistency and spreadability.

EXAMPLE 3

The procedure of Example 2 was repeated except that the fat consisted of hardened soybean oil (m.p. 28° C.) (20%) and coconut oil (20%).

A spread having a good consistency and spreadability was obtained.

EXAMPLE 4

An emulsion having the following composition was produced, following the general procedure of Example 2:

|  | % |
|---|---|
| Hardened palm kernel fat (m.p. 38° C.) | 14 |
| Hardened coconut fat (m.p. 33° C.) | 10 |
| Hardened coconut oil | 10 |
| Polyoxyethylene sorbitan monostearate | 1 |
| NaCl | 0.2 |
| Sodium alginate | 0.3 |
| Calcium hydrogen phosphate | 0.2 |

-continued

| | % |
|---|---|
| Water | 58.3 |

This emulsion destabilized on cooling at 5° C. and shaking or simply after ageing for 24 hours at 5° C.

The firmness of the spread was improved by a temperature cycling consisting of warming up the emulsion to about 30° C. and then cooling it again down to 5° C.

The solid fat levels of the fat blends used in Examples 1 to 4 are given in the Table:

TABLE

| Sample | % solid fat* Temp. | | | | | | | |
|---|---|---|---|---|---|---|---|---|
| | 5° C. | 10° C. | 15° C. | 20° C. | 25° C. | 30° C. | 35° C. | 40° C. |
| $PK_{38}$ | 96.3 | 95.9 | 93.8 | 83.8 | 58.8 | 26.8 | 9.1 | 3.8 |
| 50% $BO_{38}$ 50% CNO | 82.4 | 74.7 | 46.0 | 23.5 | 10.5 | 4.6 | 2.3 | 0.2 |
| 35% $PK_{38}$ 15% $PO_{43}$ 25% $CN_{33}$ 25% CNO | 92.5 | 88.7 | 81.2 | 56.5 | 29.4 | 17.0 | 4.7 | 2.5 |

PK = palm kernel oil
BO = soybean oil
CNO = coconut oil
CN = hardened coconut fat
PO = hardened palm oil
*measured according to the method described in "Fette, Seifen, Anstrichmittel" 80, 180-186 (1978).

I claim:
1. A process for producing an edible spreadable margarine-like emulsion, which comprises:
(a) producing an oil-in/water emulsion which comprises
  (i) 20-80 wt.% of a dispersed fat having at 10° C. a solid fat content exceeding 40%, of which the average major dimension does not exceed 6 microns;
  (ii) 80-20 wt.% of an aqueous phase; and
  (iii) an effective amount of an emulsifier conducive to surface nucleation of fat crystals, deformation of the dispersed fat and/or growth of fat crystals through the oil/water interface into the aqueous phase;
(b) simultaneously subjecting said emulsion to a mild shearing regime resulting from turbulent or non-turbulent flow conditions together with a cooling regime wherein said emulsion is cooled to a temperature ranging from 0° to 15° C. to allow fat crystallization to take place and at least partly achieve phase inversion;
(c) applying a temperature cycling involving warming up the cooled emulsion to a temperature ranging from 25° to 45° C. at which partial melting occurs; and
(d) cooling to a temperature at which the fat at least partly recrystallizes.

2. A process according to claim 1, in which 30 to 60 wt.% fat is dispersed.

3. A process according to claim 1, in which the average major dimension of the dispersed fat does not exceed 3 microns.

4. A process according to claim 1, in which the fat has at 10° C. a solid fat content exceeding 60%.

5. A process according to claim 1, in which the fat contains fat components having a melting point ranging from 30° to 70° C.

6. A process according to claim 5, in which the fat components consist of non-hydrogenated fats, hydrogenated fats and/or stearins obtained by fractionation of vegetable or animal fats.

7. A process according to claim 6, in which the fat components are selected from the group consisting of palm kernel fat of a melting point of 38° C., tristearin of a melting point of 72° C., tripalmitin of a melting point of 33° C., hardened palm oil of a melting point of 43° C. and hardened bean oil of a melting point of 38° C.

8. A process according to claim 1, in which an emulsifier having an HLB value higher than 9 is used.

9. A process according to claim 1, in which an emulsifier having an HLB value lower than 9 and a protein are used.

10. A process according to claim 1, in which the emulsifier is present in an amount sufficiently high to achieve 2-3 layers coverage at the oil/water interface.

11. A process according to claim 1, in which the emulsifier is selected from the group consisting of polyoxyethylene sorbitan monostearate, -palmitate, -laurate and polyglycerol esters of fatty acids.

12. A process according to claim 1, in which an emulsifier, selected from the group consisting of sorbitan monostearate, -mono- palmitate, -monolaurate and monoglycerides and a protein are used.

13. A process according to claim 1, in which in step (b) the emulsion is cooled to a temperature ranging from 5° to 10° C.

14. A process according to claim 1, in which in step (c) the emulsion is warmed up to a temperature ranging from 25° to 35° C.

15. A process according to claim 1, in which the mild shearing regime comprises gently agitating the emulsion by mixing or pouring it.

* * * * *